(12) United States Patent
Peppiette et al.

(10) Patent No.: US 9,531,262 B2
(45) Date of Patent: Dec. 27, 2016

(54) CHARGE PUMP

(71) Applicant: Analog Devices Technology, Hamilton (BM)

(72) Inventors: Roger Peppiette, Edinburgh (GB); Yanfeng Lu, Shanghai (CN); Bin Shao, Shanghai (CN); Linus Sheng, Shanghai (CN)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 14/147,228

(22) Filed: Jan. 3, 2014

(65) Prior Publication Data

US 2015/0194879 A1    Jul. 9, 2015

(51) Int. Cl.
G05F 1/10 (2006.01)
G05F 3/02 (2006.01)
H02M 3/07 (2006.01)

(52) U.S. Cl.
CPC .................................. H02M 3/073 (2013.01)

(58) Field of Classification Search
CPC ........ H03K 5/2481; H03K 5/249; H03K 5/24; H03K 5/2418; G01R 19/0038
USPC ......................................................... 327/536
See application file for complete search history.

(56) References Cited

U.S. PATENT DOCUMENTS

| | | | |
|---|---|---|---|
| 5,828,620 A * | 10/1998 | Foss et al. ..................... | 365/226 |
| 5,874,850 A * | 2/1999 | Pulvirenti et al. ............ | 327/536 |
| 6,028,780 A * | 2/2000 | Chang ............................ | 363/60 |
| 6,995,602 B2 * | 2/2006 | Pelliconi ...................... | 327/536 |
| 7,208,996 B2 * | 4/2007 | Suzuki et al. ................ | 327/536 |
| 7,436,241 B2 * | 10/2008 | Chen et al. ................... | 327/536 |
| 7,605,637 B2 | 10/2009 | Pannizzo et al. | |
| 7,656,688 B2 * | 2/2010 | Yeh ................................ | 363/60 |
| 8,350,616 B1 * | 1/2013 | Fu et al. ....................... | 327/536 |
| 8,665,255 B2 * | 3/2014 | Tsujino et al. ............... | 345/211 |

FOREIGN PATENT DOCUMENTS

JP    2012115046 A  *  6/2012

OTHER PUBLICATIONS

Favrat, Pierre, et al., "A New High Efficiency CMOS Voltage Doubler", Swiss Federal Institute of Technology, Electronics Labs EL-LEG Ecublens, CH-1015 Lausanne, Switzerland—E-mail: favrat @ 1eg.de. epj.ch—Mead Microeleclronics Engineering Applications and Design SA, Venoge 7, CH-I 025 St Sulpice, Switzerland.

\* cited by examiner

*Primary Examiner* — Quan Tra
(74) *Attorney, Agent, or Firm* — Schwegman Lundberg & Woessner, P.A.

(57) ABSTRACT

This application discusses, among other things apparatus and methods for a voltage boost circuit. In an example, a voltage boost circuit can include first and second inverters, sharing a first supply node, and sharing a second supply node, a first charge transfer capacitor, configured to couple a first clock signal to the first inverter output, a second charge transfer capacitor, configured to couple a second clock signal to the second inverter output, the second clock signal being out-of-phase with the first clock signal, a first gate drive capacitor, configured to couple the first clock signal to the second inverter input, and a second gate drive capacitor, configured to couple the second clock signal to the first inverter input.

17 Claims, 3 Drawing Sheets

CHARGE PUMP

BACKGROUND

An integrated circuit chip that is powered by a particular battery or other first power supply voltage may have a need to generate, on-chip, a different voltage, such as a boosted second power supply voltage having a magnitude that exceeds the first power supply voltage. Off-chip, a dc-to-dc voltage converter can make use of an inductive storage element to generate a different dc voltage from a first dc voltage. On-chip, where such an inductive storage element may be unavailable, a cyclic charge pump circuit can be used. The cyclic charge pump circuit can first charge a charge transfer capacitor using the first supply voltage during a first cycle phase. Then, during a second cycle phase, the charged capacitor can be placed in series with the first supply voltage for discharge into an output capacitor. The process can be repeated until the output capacitor has been charged to a desired voltage, which can be in excess of the first power supply voltage. The output capacitor can be used to supply the desired voltage to one or more other load circuits. Such a load circuit will draw current, which will remove charge from the output capacitor, which can then be restored using further cycles of the charge pump circuit.

OVERVIEW

The present inventors have recognized, among other things, that there remains an unmet need for improved charge pump circuits, such as can provide greater efficiency, which can lower integrated circuit power consumption and, therefore, can reduce the demands on the battery or other power supply.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
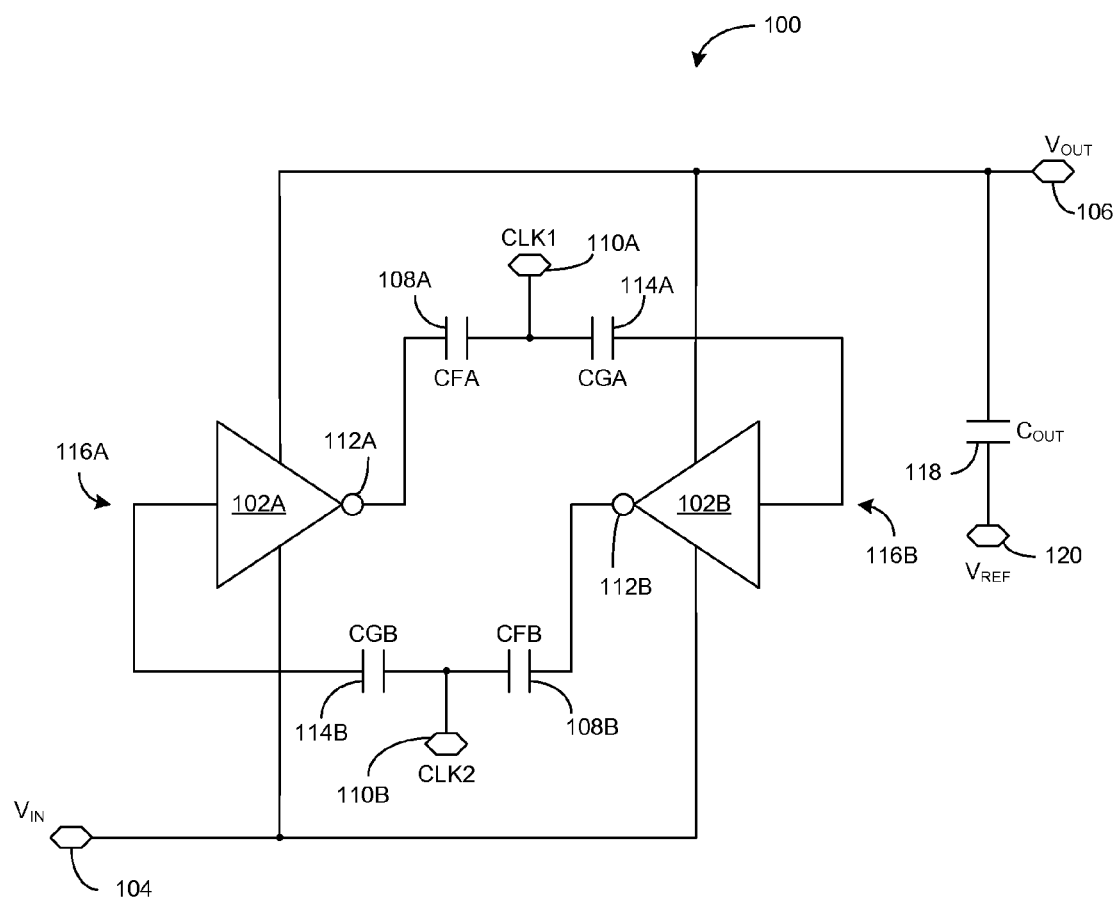
FIG. 1 illustrates generally an example of a voltage boost circuit stage.

FIG. 1 shows an example of a voltage boost circuit 100 stage. The voltage boost circuit 100 can include a first inverter 102A and a second inverter 102B. The first and second inverters 102A-B can share a first supply node 104 and a second supply node 106. The first supply node 104 can be configured to receive an input power supply voltage, $V_{in}$. The second supply node 106 can be configured to provide an output power supply voltage, $V_{out}$, such as via a cyclic charge pumping operation of the voltage boost circuit 100.

The voltage boost circuit 100 can include a first charge transfer capacitor 108A, CFA, which can be configured to capacitively couple a first clock signal, CLK1, at node 110A, to the first inverter 102A output at node 112A. A second charge transfer capacitor 108B, CFB, can be configured to capacitively couple a second clock signal CLK2, at node 110B, to the second inverter 102B output at node 112B. The first clock signal CLK1 can be non-overlapping with the second clock signal CLK2. A first gate drive capacitor 114A, CGA, can be configured to capacitively couple the first clock signal, CLK1, at node 110A, to the second inverter 102B input at node 116B. A second gate drive capacitor 114B, CGB, can be configured to capacitively couple the second clock signal, CLK2, at node 110B, to the first inverter 102A input at node 116A. An output capacitor 118, $C_{OUT}$, can be located between the second supply node 106 and a ground or other reference voltage at a reference node 120. The output capacitor 118, $C_{OUT}$, can be used to store the output power supply voltage, $V_{OUT}$, for being provided to a load circuit. IN certain examples, the voltage boost circuit can be coupled to or can include an oscillator to generate at least one of the clock signals (CLK1, CLK2).

Figure 2:
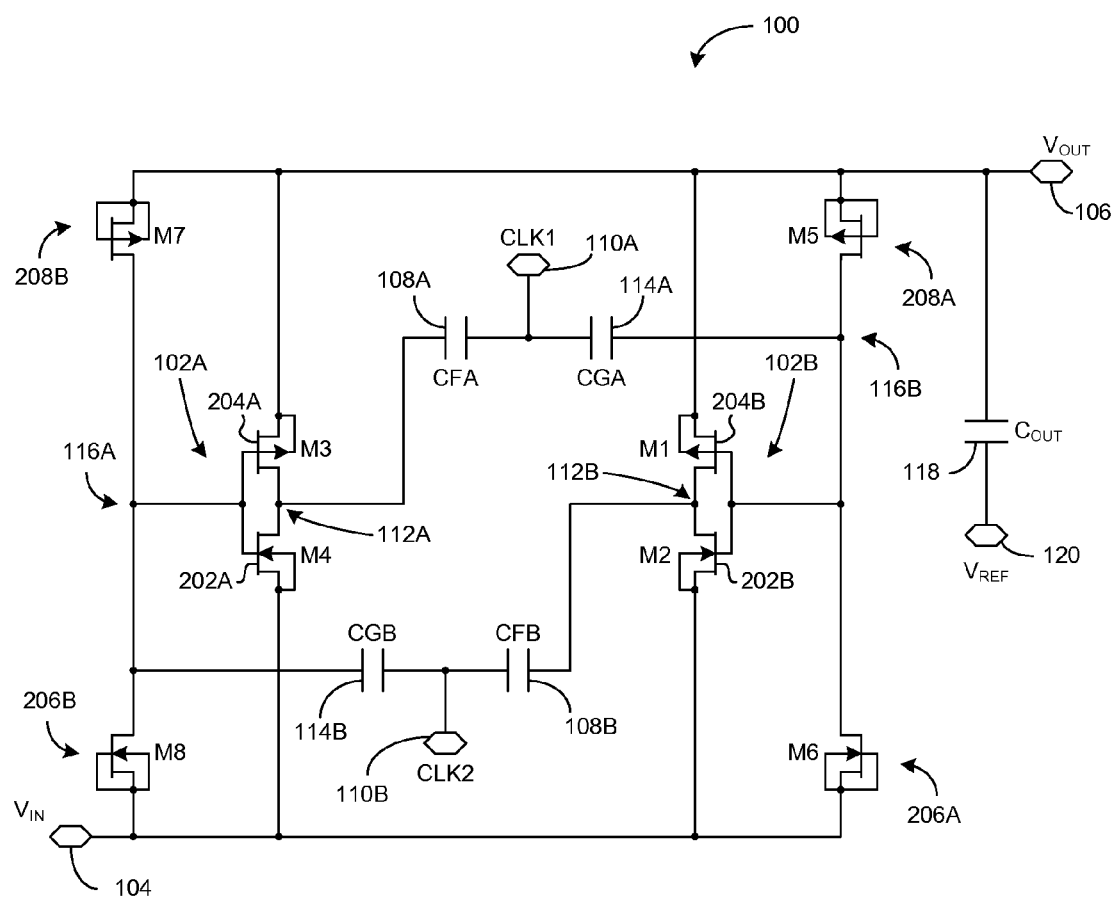
FIG. 2 illustrates generally an example of a voltage boost circuit stage in additional detail.

FIG. 2 shows an example of the voltage boost circuit 100 stage in more detail. The first inverter 102A can include field-effect transistors (FETs) or other transistors, such as an n-channel field-effect transistor (NFET) 202A, M4 and a p-channel field-effect transistor (PFET) 204A, M3. The NFET 202A, M4 can include a drain that can be coupled to node 112A, a source and body that can be coupled to the first supply voltage at node 104, and a gate that can be coupled to node 116A. The PFET 204A, M3 can include a drain that can be coupled to node 112A, a source and a body that can be coupled to the second supply voltage at node 106, and a gate that can be coupled to node 116A. The second inverter 102B can include field-effect transistors (FETs) or other transistors, such as an n-channel field-effect transistor (NFET) 202B, M2 and a p-channel field-effect transistor (PFET) 204B, M1. The NFET 202B, M2 can include a drain that can be coupled to node 112B, a source and body that can be coupled to the first supply voltage at node 104, and a gate that can be coupled to node 116B. The PFET 204B, M1 can include a drain that can be coupled to node 112B, a source and a body that can be coupled to the second supply voltage at node 106, and a gate that can be coupled to node 116B.

In FIG. 2, the voltage boost circuit 100 can also include a gate drive capacitor charging circuit, such as to couple a terminal of one of the first gate drive capacitor 114A, CGA or the second gate drive capacitor 114B, CGB to a selected one of the first supply node 104 or the second supply node 106. In certain examples, the gate drive capacitor charging circuits 206A-B and 208A-B can serve as "clamp" circuits, such as to confine the dc bias voltage of the inputs 116A-B of the respective inverters 202A-B at a value that is substantially between the voltages at nodes 104 and 106, or within a diode voltage drop thereof.

For example, a gate drive capacitor charging circuit 206A can couple a terminal, such as at node 116B, of the first gate drive capacitor 114A, CGA to the first supply node 104. A gate drive capacitor charging circuit 206B can couple a terminal, such as node 116A, of the second gate drive capacitor 114B, CGB to the first supply node 104. A gate drive capacitor charging circuit 208A can couple a terminal, such as at node 116B, of the first gate drive capacitor 114A, CGA to the second supply node 106. A gate drive capacitor charging circuit 208B can couple a terminal, such as at node 116A, of the second gate drive capacitor 114B, CGB to the second supply node 106. The gate drive capacitor charging circuits 206A-B, 208A-B can respectively include a unidirectional charging circuit, such as at least one of a junction or other diode or a diode-connected transistor.

For example, as shown in FIG. 2, the gate drive capacitor charging circuit 206B can include a diode-connected NFET M8, having its gate and drain connected to the first supply node 104, and its source connected at node 116A to a terminal of the gate drive capacitor 114B, CGB. The gate drive capacitor charging circuit 206A can include a diode-connected NFET M6, having its gate and drain connected to the first supply node 104, and its source connected at node 116B to a terminal of the gate drive capacitor CGA, 114A. The gate drive capacitor charging circuit 208B can include a diode-connected PFET M7, having its gate and drain terminal connected to the second supply node 106, and its source connected at node 116A to a terminal of the gate drive capacitor 114B, CGB. The gate drive capacitor charging circuit 208A can include a diode-connected PFET M5, having its gate and drain terminal connected to the second supply node 106, and its source connected at node 116B to a terminal of the gate drive capacitor 114A, CGA.

The gate drive capacitors 114A-B, CGA-B can respectively provide a dedicated gate drive voltage of the corresponding clock signals CLKB-A to the respective inputs 116A-B of the corresponding inverters 202A-B. As shown in the examples of FIGS. 1-2, the inverters 202A-B need not be configured in a cross-coupled "latch" configuration, which is another possible approach for implementing the voltage boost circuit 100 stage. In a cross-coupled latch configuration, the output of each of the inverters is fed back to the input of the other one of the inverters, which is different than the configuration shown in FIGS. 1-2, which can avoid this cross-coupling. By way of comparison, in such a cross-coupled latch configuration approach, current shoot-through can be a problem: as a clock signal is driving the input of a first one of the inverters in the cross-coupled latch high, the output of the other second inverter in the cross-coupled latch is actively trying to pull the clock-signal driven input of the first inverter low. Overcoming such an oppositional inverter in a cross-coupled latch requires more power consumption, and can require additional circuit space and power consumption of the driver circuit providing the clock-signal driven input of the first inverter. The larger driver circuit and slower switching transition times associated with overcoming a latched voltage in a cross-coupled configuration gives rise to current shoot-through when the driver buffer switches, such as during a switching time period when a driver buffer inverter's transistors are both "on".

Reducing such charge losses can be particularly useful in the context of a cyclic charge pump such as the voltage boost circuit 100, which can be configured to provide a boosted voltage at an output capacitor 118, $C_{OUT}$. This is because loss of charge from a higher voltage stored on a capacitor represents a higher energy loss than a corresponding loss of charge at a lower voltage stored on a capacitor. As explained herein, as the voltage boost circuit 100 stage can be serially cascaded to repeatedly boost the voltage in stages to provide an even higher boosted voltage. Therefore, reducing such charge losses can become even more important at later stages in such a serial cascade of voltage boost circuit 100 stages, since such charge losses would occur in the context of even higher boosted voltage, representing greater energy losses.

To recap, because, as shown in the examples of FIGS. 1-2, the inverters 202A-B need not be configured in a cross-coupled "latch" configuration, such current shoot-through losses can be decreased as compared to a cross-coupled "latch" configuration.

In a variation from what is illustrated in FIG. 2, one or more of the gate drive capacitor charging circuits 206A-B, 208A-B need not be implemented as a unidirectional charging using at least one of a junction or other diode or a diode-connected transistor. Instead, the gate drive capacitor circuits 206A-B, 208A-B can be otherwise implemented, such as by actively-driven switches, rather than by diodes or diode-connected transistors. Switch-based gate drive capacitor charging circuits 206A-B and 208A-B can provide dc biasing to the inputs 116A-B of the respective inverters 202A-B, which would otherwise respectively be merely capacitively coupled through the corresponding gate drive capacitors 114B-A, CGB, CGA to the clock voltages at nodes 110B-A, respectively. Using actively-driven switches can advantageously dc bias the inputs 116A-B of the inverters 202A-B at a voltage that can be driven all the way to the voltage of the corresponding one of the input node 104 or the output node 106, rather than to merely within a diode-turn-on voltage or diode-connected transistor threshold voltage thereof. This, in turn, would have the advantage of turning a corresponding transistor in the inverter 202A-B fully off, which may further improve the operating efficiency of the voltage boost circuit 100 stage, particularly when such efficiency gains can exceed any efficiency cost of actively driving such switches of the gate drive capacitor charging circuits 206A-B or 208A-B. In some examples, such dc biasing can avoid possibly "floating" the inputs 116A-B of the respective inverters 202A-B, which might otherwise put such inverters 202A-B in an indeterminate state with both inverter transistors "on" within a particular inverter, such as may permit spikethrough current to occur in such indeterminate dc bias state.

The dedicated gate drive capacitors 114A-B, CGA-B need not use too much additional space on the integrated circuit chip, because the dedicated gate drive capacitors 114A-B, CGA-B can be sized to be smaller—or much smaller—than the corresponding charge transfer capacitors 108A-B, CFA, CFB in a particular voltage boost circuit 100 stage. In an example, the capacitance value of one of the dedicated gate drive capacitors 114A-B, CGA-B can be ½ the capacitance value of one of the charge transfer capacitors 108A-B, CFA, CFG. In an example, the capacitance value of one of the dedicated gate drive capacitors 114A-B, CGA-B can be ⅕ the capacitance value of one of the charge transfer capacitors 108A-B, CFA, CFG. In an example, the capacitance value of one of the dedicated gate drive capacitors 114A-B, CGA-B can be 1/10 the capacitance value of one of the charge transfer capacitors 108A-B, CFA, CFG. Other values are also possible.

In certain examples, the a boost architecture according to the present subject matter can improve (e.g., reduce) loss of charge (1) associated with current shoot-through of a particular inverter 202A-B when both of that inverter's transistors are "on" during switching of that inverter, or (2) associated with discharge of charge transfer capacitors 108A-B, CFA, CFB.

Figure 3:
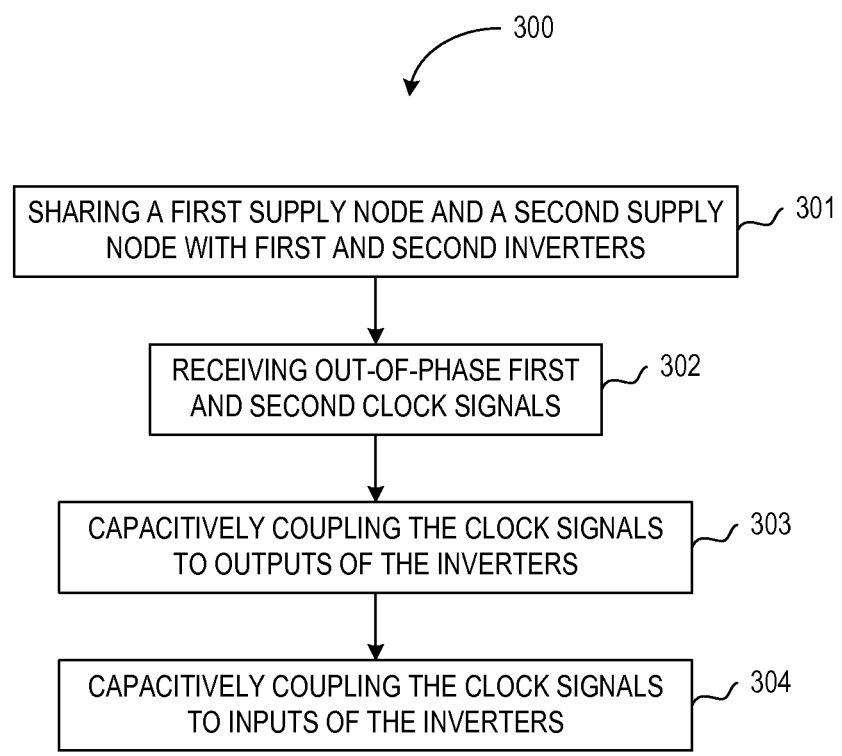
FIG. 3 illustrates generally an example of a method of operation of a voltage boost circuit.

In certain examples, multiple boost circuits can be cascaded to further generate and further boost the overall output voltage of a final stage of the cascaded boost circuits. In certain examples, the various cascaded boost circuits can share the clock signals. Each subsequent boost circuit of the cascaded circuits can receive the output voltage ($V_{out}$) of the previous circuit as the input voltage ($V_{in}$). IN certain examples, the input voltage ($V_{in}$) and the output voltage ($V_{out}$) can be quantified relative to a reference voltage ($V_{ref}$) at the reference node 120. FIG. 3 illustrates generally a flowchart of an example method 300 of providing a boosted output voltage using an input voltage and a pair of inverters of a boost circuit. At 301, first and second inverters can share a first supply node and a second supply node. In certain examples, an input voltage can be supplied on the first supply node and an output voltage can be provided on the second supply node. At 302, out-of-phase signals can be received at the boost circuit. At 303, the clock signals can be capacitively coupled to the outputs of the inverters. In certain examples, the out-of-phase first and second clock signals can be capacitively coupled to the outputs of the first and second inverters, respectively. At 304, the clock signals can be capacitively coupled to the inputs of the inverters. In certain examples, the out-of-phase first and second clock signals can be concurrently, with the method at 303, and separately capacitively coupled to the inputs of the second and first inverters, respectively. In some examples, receiving, or providing, out-of-phase first and second clock signals can include receiving first and second clock signals toggling, or oscillating, between the reference voltage and the first supply voltage. In certain examples, capacitively coupling out-of-phase first and second clock signals to the outputs of the inverters can include using first and second charge transfer capacitors. In certain examples, concurrently and separately capacitively coupling out-of-phase first and second clock to the inputs of the second and first inverters, respectively, can include using first and second gate drive capacitors. In certain examples, the method can include comprising charging at least one of the first and second gate drive capacitors using a diode-connection to one of the first and second supply nodes.

VARIOUS NOTES & EXAMPLES

In Example 1, a voltage boost circuit can include first and second inverters, sharing a first supply node, and sharing a second supply node, a first charge transfer capacitor, configured to couple a first clock signal to the first inverter output, a second charge transfer capacitor, configured to couple a second clock signal to the second inverter output, the second clock signal being out-of-phase with the first clock signal, a first gate drive capacitor, configured to couple the first clock signal to the second inverter input, and a second gate drive capacitor, configured to couple the second clock signal to the first inverter input.

In Example 2, the voltage boost circuit of claim 1 optionally includes a first gate drive capacitor charging circuit, coupling a terminal of the first gate drive capacitor to one of the first and second supply nodes, and a second gate drive capacitor charging circuit, coupling a terminal of the second gate drive capacitor to one of the first and second supply nodes.

In Example 3, the voltage boost circuit of any one or more of Examples 1-2 optionally includes a third gate drive capacitor charging circuit, coupling the terminal of the first gate drive capacitor to the other one of the first and second supply nodes than coupled to by the first gate drive capacitor charging circuit, and a fourth gate drive capacitor charging circuit, coupling the terminal of the second gate drive capacitor to the other one of the first and second supply nodes than coupled to by the second gate drive capacitor charging circuit.

In Example 4, at least one of the first gate drive capacitor charging circuit, the second gate drive capacitor charging circuit, the third gate drive capacitor charging circuit, or the fourth gate drive capacitor charging circuit of any one or more of Examples 1-3 optionally include a gate drive capacitor charging transistor.

In Example 5, the gate drive capacitor charging transistor of any one or more of Examples 1-4 optionally includes a diode-connected field-effect transistor (FET).

In Example 6, at least one of the first gate drive capacitor charging circuit or the second gate drive capacitor charging circuit of any one or more of Examples 1-5 optionally includes at least one of a diode or a diode-connected field-effect transistor (FET).

In Example 7, at least one of the first and second charge transfer capacitors of any one or more of Examples 1-6 optionally is at least 2 times the capacitance value as at least one of the first and second gate drive capacitors.

In Example 8, the voltage boost circuit of any one or more of Examples 1-7 optionally includes an oscillator circuit, configured to provide the first and second clock voltage signals, wherein the first and second clock voltage signals respectively oscillate between a reference voltage at a reference node and an input supply voltage at the first power supply node, and an output voltage storage capacitor, coupled between the second power supply node and the reference node.

In Example 9, the voltage boost circuit of any one or more of Examples 1-8 optionally includes the voltage boost circuit in a serially-cascaded configuration with at least one other such voltage boost circuit.

In Example 10, a voltage boost circuit receiving an input supply voltage, Vin, relative to a reference voltage, Vref, providing a larger magnitude output supply voltage, Vout, relative to Vref can include a field-effect transistor (FET) first inverter circuit, including a first power supply node coupled to Vout and a second power supply node coupled to Vin, and a first input node and a first output node, a FET second inverter circuit, including a third power supply node coupled to Vout and a fourth power supply node coupled to Vin, and a second input node and a second output node, a first clock node, configured to receive a first clock signal having a first clock phase, a second clock node, configured to receive a second clock signal having a second clock phase that is out-of-phase with the first clock phase, a first charge transfer capacitor, coupled between the first output node of the first inverter and the first clock node, a second charge transfer capacitor, coupled between the second output node of the second inverter and the second clock node, a first gate drive capacitor, coupled between the first clock node and the second input node of the second inverter, and a second gate drive capacitor, coupled between the second clock node and the first input node of the first inverter.

In Example 11, the voltage boost circuit of any one or more of Examples 1-10 optionally includes a first diode or diode-connected FET, coupled between Vout and the first input of the first inverter, a second diode or diode-connected FET, coupled between Vout and the second input node of the second inverter, a third diode or diode-connected FET, coupled between Vin and the first input of the first inverter, and a fourth diode or diode-connected FET, coupled between Vin and the second input node of the second inverter.

In Example 12, a method of generating a boosted voltage can include providing first and second inverters, sharing a first supply node, and sharing a second supply node, receiving or providing out-of-phase first and second clock signals, and capacitively coupling the out-of-phase first and second clock signals to the outputs of the first and second inverters, respectively, and concurrently separately capacitively coupling the out-of-phase first and second clock signals to the inputs of the second and first inverters, respectively.

In Example 13, the method of any one or more of Examples 1-11 optionally includes boosting a second supply voltage at the second supply node to a higher magnitude with respect to a reference voltage than a first supply voltage at the first supply node.

In Example 14, the receiving or providing out-of-phase first and second clock signals of any one or more of Examples 1-13 optionally includes receiving first and second clock signals toggling between the reference voltage and the first supply voltage.

In Example 15, the capacitively coupling the out-of-phase first and second clock signals to the outputs of the first and second inverters, respectively, and concurrently separately capacitively coupling the out-of-phase first and second clock signals to the inputs of the second and first inverters, respectively, of any one or more of Examples 1-14 optionally includes providing first and second charge transfer capacitors for the capacitively coupling the out-of-phase first and second clock signals to the outputs of the first and second inverters, and providing separate first and second gate drive capacitors for the concurrently separately capacitively coupling the out-of-phase first and second clock signals to the inputs of the second and first inverters.

In Example 16, the method of any one or more of Examples 1-15 optionally includes charging at least one of the first and second gate drive capacitors using a diode-connection to one of the first and second supply nodes.

In Example 17, the method of any one or more of Examples 1-16 optionally includes charging at least one of the first and second gate drive capacitors to one of the first and second supply nodes, and automatically ceasing the charging of the at least one of the first and second gate drive capacitors when a voltage on the at least one of the first and second gate drive capacitors is brought within a specified value of a voltage at the one of the first and second supply nodes.

In Example 18, the specified value of any one or more of Examples 1-17 optionally is one of a diode-turn-on voltage or a diode-connected transistor threshold voltage.

In Example 19, the capacitively coupling the out-of-phase first and second clock signals to the outputs of the first and second inverters, respectively, and concurrently separately capacitively coupling the out-of-phase first and second clock signals to the inputs of the second and first inverters, respectively, of any one or more of Examples 1-18 optionally includes, alternatingly, turning on a field-effect transistor (FET) of one of the first and second inverters to couple one of the first and second charge transfer capacitors to the second supply node, and turning on a FET of the other one of the first and second inverters to couple the other one of the first and second charge transfer capacitors to the second supply node.

In Example 20, the method of any one or more of Examples 1-19 optionally includes providing at least two serially cascaded stages of the first and second inverters, wherein the second supply node of a preceding stage provides the first supply node of an immediately subsequent stage, and boosting a second supply voltage at the second supply node of a final stage of the cascaded stages to more than twice the magnitude with respect to a reference voltage than a first supply voltage at the first supply node of a first stage of the cascaded stages.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A voltage boost circuit comprising:
   first and second inverters, sharing a first supply node, and sharing a second supply node and wherein at least one inverter of the first and second inverters includes a single, signal input node;
   a first charge transfer capacitor, configured to couple a first clock signal to an output of the first inverter;
   a second charge transfer capacitor, configured to couple a second clock signal to an output of the second inverter, the second clock signal being out-of-phase with the first clock signal;
   a first gate drive capacitor, configured to couple the first clock signal to the input node of the second inverter;
   a second gate drive capacitor, configured to couple the second clock signal to the input node of the first inverter;
   a first diode;
   a second diode coupled in series, using a first common node, with the first diode, the first and second diode coupled between the first supply node and the second supply node, wherein the first common node is coupled to the input node of the first inverter and to the second gate drive capacitor; and
   wherein the first inverter is not coupled in a cross-coupled latch configuration.

2. The voltage boost circuit of claim 1, comprising:
   a third diode; and
   a fourth diode coupled in series, using a second common node, with the third diode, the third and fourth diodes coupled between the first supply node and the second supply node, wherein the second common node is coupled to the input node of the second inverter and to the first gate drive capacitor.

3. The voltage boost circuit of claim 1, wherein at least one of the first diode, the second diode, the third diode or the fourth diode comprises a diode-connected transistor.

4. The voltage boost circuit of claim 1, wherein at least one of the first and second charge transfer capacitors is at least 2 times the capacitance value as at least one of the first and second gate drive capacitors.

5. The voltage boost circuit of claim 1, further comprising:
   an oscillator circuit, configured to provide the first and second clock voltage signals, wherein the first and second clock voltage signals respectively oscillate between a reference voltage at a reference node and an input supply voltage at the first power supply node; and
   an output voltage storage capacitor, coupled between the second power supply node and the reference node.

6. The voltage boost circuit of claim 1 in a serially-cascaded configuration with at least one other such voltage boost circuit and using inverters rated for a voltage difference of each circuit's respective first and second supply nodes.

7. A voltage boost circuit receiving an input supply voltage, $V_{in}$, relative to a reference voltage, $V_{ref}$, providing a larger magnitude output supply voltage, $V_{out}$, relative to $V_{ref}$, the voltage boost circuit comprising:
   a field-effect transistor (FET) first inverter circuit, including a first power supply node coupled to $V_{out}$ and a second power supply node coupled to $V_{in}$, and a first input node and a first output node, wherein the field-effect transistor (FET) first inverter circuit includes a single, signal input node;
   a FET second inverter circuit, including a third power supply node coupled to $V_{out}$ and a fourth power supply node coupled to $V_{in}$, and a second input node and a second output node;
   a first clock node, configured to receive a first clock signal having a first clock phase;
   a second clock node, configured to receive a second clock signal having a second clock phase that is out-of-phase with the first clock phase;
   a first charge transfer capacitor, coupled between the first output node of the first inverter and the first clock node;
   a second charge transfer capacitor, coupled between the second output node of the second inverter and the second clock node;
   a first gate drive capacitor, coupled between the first clock node and the second input node of the second inverter;
   a second gate drive capacitor, coupled between the second clock node and the first input node of the first inverter;
   a first diode or diode-connected FET, coupled between $V_{out}$ and the first input of the first inverter;
   a second diode or diode-connected FET, coupled between $V_{out}$ and the second input node of the second inverter;
   a third diode or diode-connected FET, coupled between $V_{in}$ and the first input of the first inverter;
   a fourth diode or diode-connected FET, coupled between $V_{in}$ and the second input node of the second inverter;
   wherein the first inverter circuit is not coupled in a cross-coupled latch configuration; and
   wherein the first and second gate drive capacitors are configured to confine an input voltage of each of the first and second inverters between a voltage level of the first supply node and a voltage level of the second supply node.

8. A method of generating a boosted voltage, comprising:
   providing an input voltage at a first supply node shared by first and second inverters;
   providing an output voltage at a second supply node shared by the first and second inverters;
   wherein at least one inverter of the first and second inverters includes a single, signal input node;
   receiving or providing out-of-phase first and second clock signals;
   capacitively coupling the out-of-phase first and second clock signals to the outputs of the first and second inverters, respectively, and concurrently, separately, capacitively coupling the out-of-phase first and second clock signals to the inputs of the second and first inverters, respectively; and
   confining an input voltage of the first inverter between a voltage level of the first supply node and a voltage level of the second supply node using a first diode coupled in series, at a first common node, with a second diode between the first supply node and the second supply;
   confining an input voltage of the second inverter between a voltage level of the first supply node and a voltage level of the second supply node using a third diode coupled in series, at a third common node with a fourth diode, the series coupled third and fourth diodes coupled between the first supply node and the second supply; and wherein the first inverter is not coupled in a cross-coupled latch configuration.

9. The method of claim 8, comprising boosting a second supply voltage at the second supply node to a higher magnitude with respect to a reference voltage than a first supply voltage at the first supply node.

10. The method of claim 9, wherein the receiving or providing out-of-phase first and second clock signals comprises receiving first and second clock signals toggling between the reference voltage and the first supply voltage.

11. The method of claim 9, wherein the capacitively coupling the out-of-phase first and second clock signals to the outputs of the first and second inverters, respectively, and concurrently separately capacitively coupling the out-of-phase first and second clock signals to the inputs of the second and first inverters, respectively; comprises:

providing first and second charge transfer capacitors for the capacitively coupling the out-of-phase first and second clock signals to the outputs of the first and second inverters; and providing separate first and second gate drive capacitors for the concurrently separately capacitively coupling the out-of-phase first and second clock signals to the inputs of the second and first inverters.

12. The method of claim 11, comprising charging at least one of the first and second gate drive capacitors using a diode-connection to one of the first and second supply nodes.

13. The method of claim 11, comprising:

charging at least one of the first and second gate drive capacitors to one of the first and second supply nodes; and automatically ceasing the charging of the at least one of the first and second gate drive capacitors when a voltage on the at least one of the first and second gate drive capacitors is brought within a specified value of a voltage at the one of the first and second supply nodes.

14. The method of claim 13, wherein the specified value is one of a diode-turn-on voltage or a diode-connected transistor threshold voltage.

15. The method of claim 14, wherein the capacitively coupling the out-of-phase first and second clock signals to the outputs of the first and second inverters, respectively, and concurrently separately capacitively coupling the out-of-phase first and second clock signals to the inputs of the second and first inverters, respectively, comprises alternatingly:

turning on a field-effect transistor (FET) of one of the first and second inverters to couple one of the first and second charge transfer capacitors to the second supply node; and turning on a FET of the other one of the first and second inverters to couple the other one of the first and second charge transfer capacitors to the second supply node.

16. The method of claim 15, comprising:

providing at least two serially cascaded stages of the first and second inverters, wherein the second supply node of a preceding stage provides the first supply node of an immediately subsequent stage; and boosting a second supply voltage at the second supply node of a final stage of the cascaded stages to more than twice the magnitude with respect to a reference voltage than a first supply voltage at the first supply node of a first stage of the cascaded stages.

17. The voltage boost circuit of claim 1, wherein at least one inverter of the first and second inverters includes a pair of complimentary transistors coupled in series between the first supply node and the second supply node, and a control node of one of the complimentary transistors coupled to a control node of the other complimentary transistor to provide the single signal input node of the at least one inverter.

* * * * *